(12) United States Patent
Shaw et al.

(10) Patent No.: US 8,432,482 B2
(45) Date of Patent: Apr. 30, 2013

(54) METHOD AND APPARATUS FOR AUTOMATICALLY OPTIMIZING OPTICAL CONTRAST IN AUTOMATED EQUIPMENT

(75) Inventors: Casey E. Shaw, Fort Collins, CO (US); Ronald Stuart Anderson, Loveland, CO (US); Perry H. Pierce, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/353,599

(22) Filed: Jan. 19, 2012

(65) Prior Publication Data
US 2012/0133824 A1    May 31, 2012

Related U.S. Application Data

(62) Division of application No. 11/759,102, filed on Jun. 6, 2007, now Pat. No. 8,125,562, which is a division of application No. 10/152,713, filed on May 22, 2002, now Pat. No. 7,256,833.

(51) Int. Cl.
*H04N 5/222*    (2006.01)
*H04N 5/238*    (2006.01)

(52) U.S. Cl.
USPC .......................... 348/370; 348/365; 118/713

(58) Field of Classification Search ........... 348/365, 348/180, 187
See application file for complete search history.

(56) References Cited

U.S. PATENT DOCUMENTS

| 5,038,258 | A | * | 8/1991 | Koch et al. ............. 362/237 |
| 5,052,338 | A |   | 10/1991 | Maiorca et al. |
| 5,461,436 | A | * | 10/1995 | Campbell ............... 351/242 |
| 5,822,053 | A | * | 10/1998 | Thrailkill ............. 356/237.1 |
| 5,906,682 | A |   | 5/1999 | Bouras et al. |
| 6,038,340 | A | * | 3/2000 | Ancin et al. ............ 382/167 |
| 6,115,492 | A | * | 9/2000 | Meltzer et al. .......... 382/162 |
| 6,208,749 | B1 |  | 3/2001 | Gutkowicz-Drusin et al. |
| 6,236,331 | B1 |  | 5/2001 | Dussureault |
| 6,454,437 | B1 |  | 9/2002 | Kelly |
| 6,488,390 | B1 |  | 12/2002 | Lebens et al. |
| 6,542,238 | B1 |  | 4/2003 | Tsuboi et al. |
| 6,876,392 | B1 |  | 4/2005 | Uomori et al. |

(Continued)

FOREIGN PATENT DOCUMENTS
JP    11-202572    2/2001

OTHER PUBLICATIONS

Edmund Industrial Optics:, , "Optics and Optical Instruments Catatlog 2002", *LED/Strobe Illumination*, Reference No. N)21-R160, 254.
Fujita, Minoru, "Machine Translation of JP11-202572".

*Primary Examiner* — Hung Lam

(57) ABSTRACT

Techniques for automatically adjusting and/or optimizing the color and/or intensity of the illuminating light used in a vision system is presented. The intensity of each of a plurality of illuminating light colors is allowed to be independently adjusted to adapt the illumination light based on the color of a part feature against the part feature background of a part being viewed by the vision system to produce high contrast between the part feature and background. Automated contrast optimization may be achieved by stepping through all available color combinations and evaluating the contrast between the part feature and background to select a color combination having a "best" or acceptable contrast level.

6 Claims, 9 Drawing Sheets

U.S. PATENT DOCUMENTS

| | | |
|---|---|---|
| 7,889,919 B2 * | 2/2011 | Komiya et al. ............... 382/162 |
| 2001/0048406 A1 | 12/2001 | Masumoto et al. |
| 2003/0035580 A1 * | 2/2003 | Wang et al. .................. 382/176 |
| 2004/0071331 A1 * | 4/2004 | Lawless et al. ............... 382/133 |
| 2005/0063195 A1 | 3/2005 | Kawakami |
| 2006/0166305 A1 | 7/2006 | Jiang et al. |
| 2010/0033724 A1 | 2/2010 | Cork et al. |

* cited by examiner

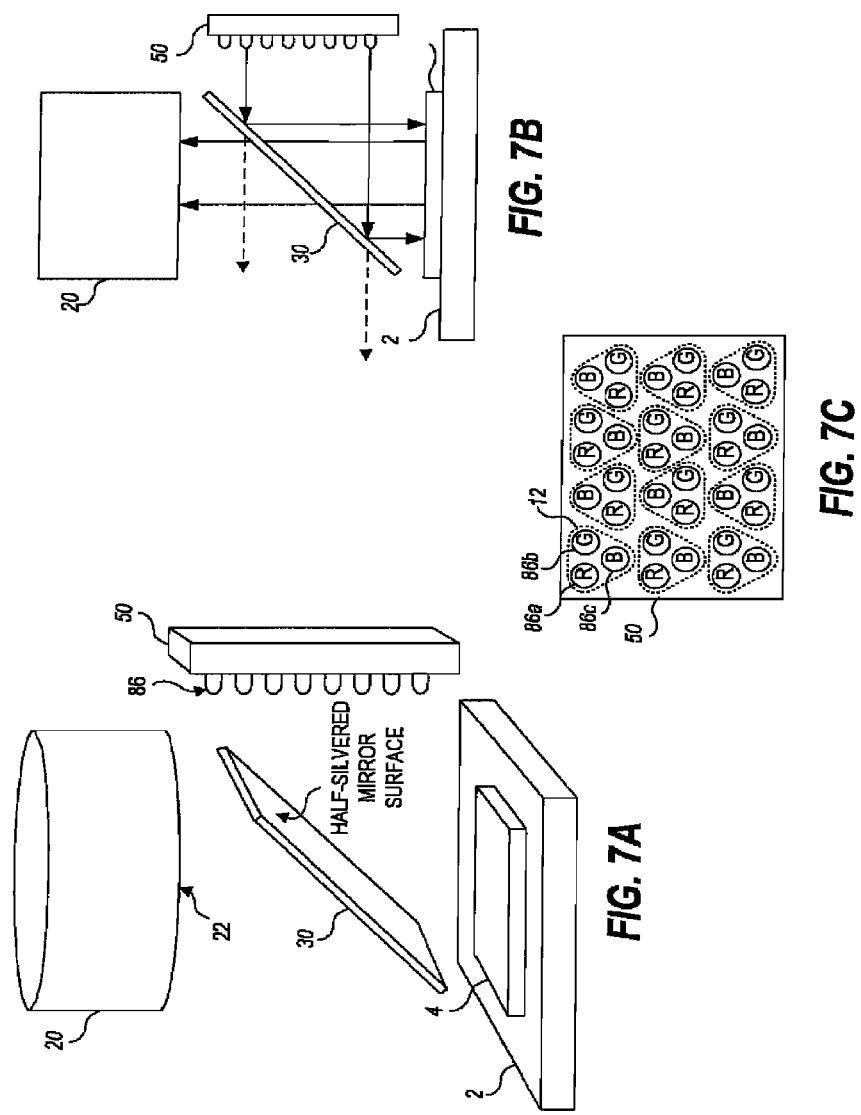

METHOD AND APPARATUS FOR AUTOMATICALLY OPTIMIZING OPTICAL CONTRAST IN AUTOMATED EQUIPMENT

CROSS-REFERENCE TO RELATED APPLICATIONS

This application is a divisional of U.S. patent application Ser. No. 11/759,102, filed Jun. 6, 2007, which is a divisional of U.S. patent application Ser. No. 10/152,713, filed May 22, 2002, now U.S. Pat. No. 7,256,833, the entire disclosures of which are hereby incorporated herein by reference.

FIELD OF THE INVENTION

The present invention pertains generally to electronic vision systems, and more particularly, to a method and apparatus for automatically adapting the color and intensity of the illumination light according to the color(s) of the object(s) being viewed in order to obtain optimal image contrast.

BACKGROUND OF THE INVENTION

Continuing miniaturization of circuit components and increasing complexity of boards is driving the need for automated optical inspection. Many types of automated equipment combine cameras and computers to form a vision system that assists in the identification, location, or processing of parts. Such vision systems are also used to correctly position robotic equipment parts which call for extremely high positioning accuracy.

One of the many challenges in designing a computer vision system is the difficulty of obtaining adequate visual contrast for accurately identifying or locating a desired feature of a part being processed. The inability to locate the desired feature of the part, or the generation of inaccurate location data by the vision system may result in mere processing inconvenience or may have more costly and damaging consequences.

For example, if the vision system is designed to generate an error condition when it is unable to locate a desired feature, the error condition may trigger the automated equipment to shut down processing of the part, causing the work to be stopped and therefore inefficiency in production.

As another example, a slightly impaired ability to locate a desired feature of a part being processed could cause the vision system to generate an inaccurate location result. When this occurs, the vision system is unaware of the inaccuracy of the location data, and therefore no error code is generated. Accordingly, the automated equipment does not shut down processing of the part, but continues to operate. This may have disastrous results if any position of the processing involves robotic contact with the part.

For example, vision systems are often used to apply adhesive to silicon chips during packaging. The adhesive is applied in predetermined locations on the silicon chip by an adhesive dispensing needle. Because the silicon chips are relatively small, the adhesive must be applied in a very controlled and precise manner, and accordingly, the needle comes into very close proximity to the surface of the chip. However, the automated adhesive dispensing equipment must be accurate enough to come into the required close proximity with the chip without allowing the needle to make actual contact with the chip's surface since actual contact can result in damage to the chip.

If the adhesive is applied in the incorrect location, or if the needle used to dispense the adhesive makes contact with, and therefore damages, the chip, the silicon chip becomes unusable, thereby increasing production costs and decreasing production efficiency.

However, a more serious consequence results if, as a result of inaccurate vision system location data, the adhesive dispensing needle comes into contact with either the chip or the automated equipment plate on which the chip is mounted and causes the needle to bend. A bent needle can contribute to the scrapping of many subsequent production parts. While a subsequent silicon chip may be located correctly by the vision system, the bent needle will cause the adhesive to be dispensed in the incorrect location on all future parts until the problem is observed by the equipment operator and the needle replaced. This can be extremely costly if a bent needle occurs early in a production run of expensive integrated circuit assemblies.

Depending on the chosen manufacturing process and chemical properties of the films and substrates of a silicon die, the surface of the die may vary in color. For example, while there are a variety of processes that can produce varying colors of parts, one color-varying effect is due to the thickness of a layer of silicon nitride that is grown on the silicon wafer during processing. Different thicknesses of this layer result in different colors as the wavelengths of light interact with the thickness of the silicon nitride layer. Accordingly, one silicon die manufactured by a given process with a first thickness of a silicon nitride layer may have a light-green appearance, while another type of die manufactured using the same process but applying a silicon nitride layer of a different second thickness may have a deep-blue appearance.

Automated adhesive dispensing equipment processing these parts needs to accurately determine the location of the silicon die prior to dispensing adhesive. Typical equipment uses an array of light-emitting diodes (LEDs) to illuminate the silicon die. The most common color of light used is red, likely due to the availability, low cost, and high light intensity produced by red LEDs. This array of LEDs may be located in a ring around the camera lens, in a planar array directed onto the product through a half-silvered mirror, or other illumination configurations.

Color begins in light that contains more of some wavelengths than others, stimulating the three types (Red (R), Green (G), Blue (B)) of color receptor cones (in a human's eye) unequally. These R, G and B cone responses can be applied to describe the color sensation that results from any mixture of light wavelengths.

A camera interprets wavelengths of light to create a perception of color. The camera's interpretation of the wavelengths of light is based on the trichromatic theory of color vision by which any color may be generated by a combination of red, green, and/or blue light. This theory therefore employs additive color mixing.

FIG. 1 illustrates a coarse color wheel for light. As illustrated, colors that lie opposite one another in the color wheel are considered complementary colors. Images taken of objects of a given color appear with very low contrast when illuminated with light of a complementary color.

FIGS. 2 and 3 illustrate example black-and-white images of silicon dies 4a, 4b as would be seen by a vision system of a conventional automated fluid dispensing equipment that uses red LEDs for illumination. The actual silicon die 4a pictured in the image of FIG. 2 has a green tint and the background plate 2 is a dark grey or black color. Accordingly, since the color green is not opposite the color red on the color wheel of FIG. 1, green is not a complementary color of red. Accordingly, red illumination light results in good contrast between the die 4a and background 2. In FIG. 3, however, the actual silicon die 4b has a blue tint. In this case, the color blue is a complementary color of red, and therefore red illumination light results in low contrast. Red illumination light is therefore a poor choice of illumination light color for this application.

FIGS. 4 and 5 illustrate example black-and-white images of silicon dies 4c, 4d as would be seen by a vision system of a conventional automated fluid dispensing equipment that uses blue LEDs for illumination. The silicon die 4c in FIG. 4 has a green tint. Accordingly, since the color green is not opposite the color blue on the color wheel of FIG. 1, green is not a complementary color of blue. Accordingly, blue illumination light results in good contrast between the die 4a and background 2. In FIG. 5, however, the silicon die 4d has a dark blue tint. In this case, since the color dark blue is adjacent rather than opposite the color light blue on the light color wheel, blue illumination light results in high contrast.

FIGS. 2-5 illustrate that contrast can be improved in a vision system by changing the color of the illuminating light. However, when the color of the product being processed changes frequently it is not practical to change the illumination color by replacing LEDs in the vision system. In the example of FIGS. 2-5, within one type of silicon die, the color remains consistent enough for the replacement method to work, and the blue light works well for both the green and blue die surfaces. If, however, the nitride thickness were changed slightly to produce a reddish appearing die surface, the blue light illuminating the red die would be as ineffective as the red light on the blue die as shown in FIG. 3.

In summary, while many parts have a very consistent appearance, it is possible for the optical characteristics of some parts to vary considerably during production. A slight change in the reflectivity or color of the part can significantly affect the difference in contrast between the desired feature of the part and the background. For parts subject to considerable variation, to avoid production halts or product or equipment damage, it would be desirable if the equipment could automatically adjust for varying part image conditions.

Accordingly, a need exists for a vision system which allows varying the illuminating light color and intensity. A need also exists for a method for allowing the vision system to vary the illuminating light color and intensity automatically. A need further exists for a vision system which optimizes the contrast between the desired feature of a part being processed and the background on which the part is mounted.

SUMMARY OF THE INVENTION

The present invention is a method and apparatus for automatically optimizing the illuminating light color and intensity in a computerized vision system. The three primary colors of light (red, green, blue) are used in the vision system to generate the illuminating light. Varying the intensity of each color independently provides the capability of optimizing the contrast of an attribute of the product compared to the background. Varying the intensity of all colors simultaneously provides the capability of varying the overall intensity or brightness of the illumination. Variations in the surface texture, reflectivity, color, or other appearance features can be compensated for by merely changing the color of the illuminating light in the illumination system. The contrast may be automatically optimized on a part-by-part or a periodic basis of a manufacturing run.

To perform automated contrast optimization, all available color combinations may be stepped through to evaluate the contrast between the part and background and to select a color combination having a "best" or acceptable contrast level. In the alternative, contrast optimization may be achieved by performing a "smart" search. In this technique, the contrast for the primary and/or secondary colors may be measured, and then, based on the contrast measurements, the colors adjacent to or surrounding the maximum contrast measured in the first pass may be stepped through to find the color combination with the optimal level.

BRIEF DESCRIPTION OF THE DRAWING

The invention will be better understood from a reading of the following detailed description taken in conjunction with the drawing in which like reference designators are used to designate like elements, and in which:

FIG. 7A is a block diagram of an alternative embodiment of a portion of a vision system implemented in accordance with the principles of the invention using collinear illumination;

FIG. 7B is a side view of the vision system of FIG. 7A;

FIG. 7C is a plan view of the illuminating surface of the LED circuit board of FIG. 7A;

DETAILED DESCRIPTION

A novel method and circuit for automatically optimizing the color and intensity of the illumination light in a computerized vision system is described in detail hereinafter. Although the invention is described in terms of specific illustrative embodiments, it is to be understood that the embodiments described herein are by way of example only and that the scope of the invention is not intended to be limited thereby.

Figure 1:
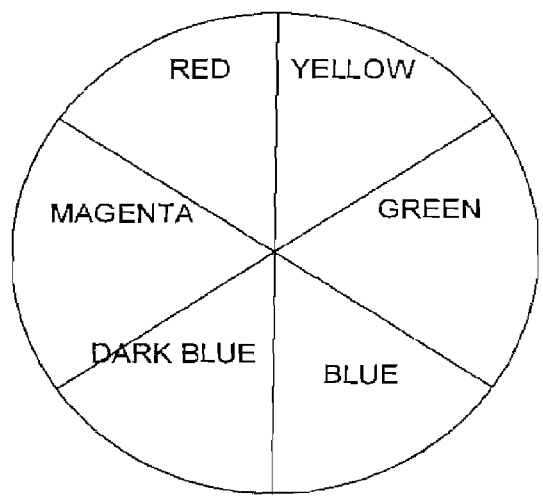
FIG. 1 is a diagram illustrating a color wheel for light.
Figure 2:
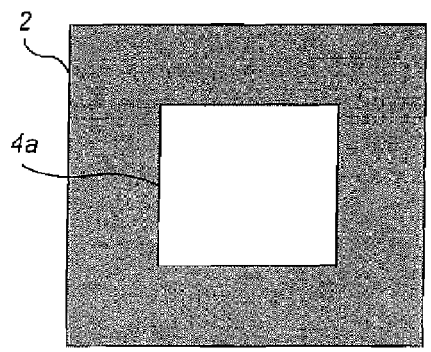
FIG. 2 is a black-and-white image of a silicon die part having a green surface as illuminated by a vision system with red light.
Figure 3:
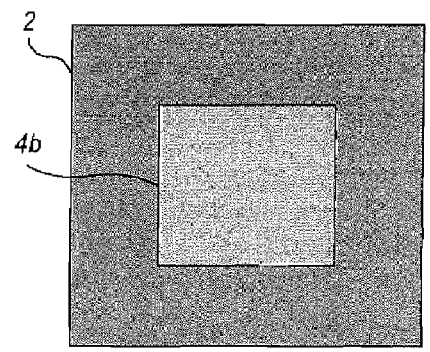
FIG. 3 is a black-and-white image of a silicon die part having a dark blue surface as illuminated by a vision system with red light.
Figure 4:
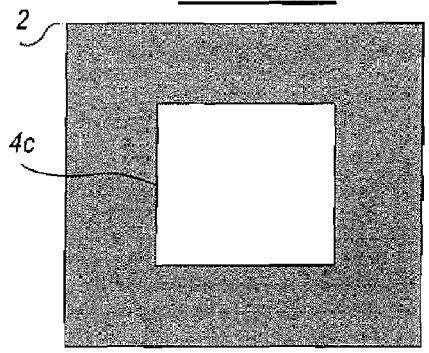
FIG. 4 is a black-and-white image of a silicon die part having a green surface as illuminated by a vision system with blue light.
Figure 5:
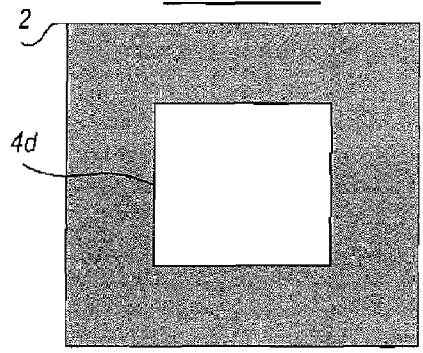
FIG. 5 is a black-and-white image of a silicon die part having a dark blue surface as illuminated by a vision system with blue light.
Figure 6A:
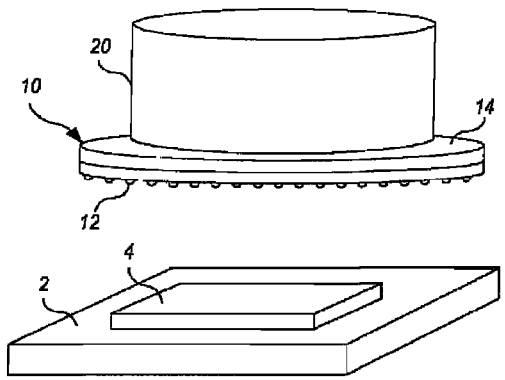
FIG. 6A is a perspective view of a portion of a vision system implemented with LEDs in a surround pattern in accordance with the principles of the invention.
Figure 6B:
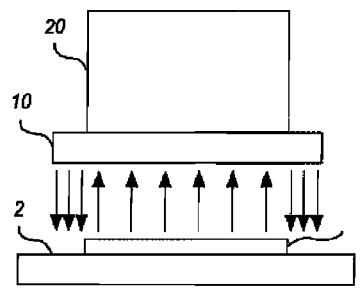
FIG. 6B is a side view of the vision system of FIG. 6A.

Turning now to the invention, FIG. 6A is a perspective view, and FIG. 6B is a side view, of a camera 20 and LED circuit board 10 of a vision system implemented in accordance with the principles of the invention. As illustrated, the LED circuit board 10 is physically attached to the camera 20. For simplification of understanding the invention, the power, control, and robotic elements of the vision system are not shown; however, it is to be understood that all of these elements are present. During optical inspection operations (for example, locating a desired feature on a part 4 being processed), the camera lens 22 (FIG. 6C) of the camera 20 is positioned over all or a portion of the part 4 being inspected. In the illustrative embodiment, the part 4 being processed is a silicon die. The die 4 is positioned on a plate 2 having a dark grey or black color, which forms the background of the image obtained by the camera 20.

Figure 6C:
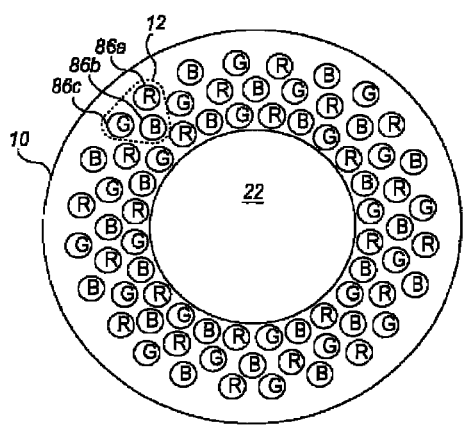
FIG. 6C is a plan view of the illuminating surface of the surround pattern LED circuit board of FIGS. 6A and 6B looking into the lens.

As shown in FIG. 6C, a plurality of LEDs comprising all three primary colors (R, G, B) are arranged in RGB triplets 12 on the LED circuit board 10 in a circular surround pattern as shown. When mounted to the camera 20, the LED circuit board 10 surrounds the camera lens 22, forming a ring of illuminating LEDs around the area of focus of the lens 22. The LEDs surround the camera lens 22 to provide uniform lighting of the part 4 being processed. The red (R) 86$a$, green (G) 86$b$, and blue (B) 86$c$ LEDs are spaced and staggered to have the RGB triplets 12 in close proximity to each other to enhance the blending of the light.

The LED circuit board 10 includes illumination light control circuitry 14, discussed hereinafter, which allows the intensity of each LED 12 to be independently adjusted. The resulting light produced by the mixing of the three LED colors R, G, B, can produce practically any color. Varying the intensity of all of the colors simultaneously will vary the overall intensity of the light.

As illustrated in FIG. 6B, light from the illuminating LEDs 12 of the LED circuit board 10 uniformly illuminates the part 4 being processed. Depending on the surface color of the part 4, the part will absorb light of certain wavelengths and reflect light of other wavelengths. As described previously, the optimal color of the illuminating light will vary depending on the surface color of the part 4.

FIGS. 7A-7C illustrate an alternative embodiment of a vision system of the invention. In this embodiment, the LED circuit board 50 is not mounted on the camera itself 20, but is instead arranged transverse to the angle of the camera lens 22 to shine light between the lens 22 and part 4. The lens 22 of the camera 20 views the part 4 being processed through a half-silvered mirror 30. The half-silvered mirror 30 reflects the light sourced by the LEDs 86 so that the light shines perpendicular to the angle of light received by the camera lens 22. The mirror 30 is half-silvered to allow the light reflecting off the part 4 to shine back through the mirror 30 and into the camera lens 22. The LED circuit board 50 is adjustable to produce a desired color and intensity of light. In the preferred embodiment, the mirror 30 is arranged at an angle $\phi$ of 45° with respect to the horizontal surface of the part 4 being processed, with reflective side down, as shown.

FIG. 7C illustrates an example LED pattern of the LED circuit board 50 of FIG. 7A. As illustrated, the red (R) 86$a$, green (G) 86$b$, and blue (B) 86$c$ LEDs are spaced and staggered to have the RGB triplets in close proximity to each other to enhance the blending of the light.

In all implementations of the LED circuit board 10, 50, the intensity of the three different colors of LEDs 86 should be controlled independently. One method of achieving this is to implement an electronic control circuit to separately control the current to each triplet 12 of LEDs 86. For example, if each of the three LED colors RGB 86$a$, 86$b$, 86$c$ were allowed two independent levels of intensity by a control circuit (i.e., a binary implementation), the circuit would allow $2^3$ or 8 "colors" of available light. TABLE 1 demonstrates this example.

TABLE 1

| RED LED INTENSITY | GREEN LED INTENSITY | BLUE LED INTENSITY | OVERALL INTENSITY | OVERALL COLOR |
|---|---|---|---|---|
| 0 | 0 | 0 | None | None |
| 1 | 0 | 1 | Low | Red |
| 0 | 1 | 0 | Low | Green |
| 0 | 0 | 1 | Low | Dark Blue |
| 1 | 1 | 0 | Medium | Yellow |
| 1 | 0 | 1 | Medium | Magenta |
| 0 | 1 | 1 | Medium | Blue |
| 1 | 1 | 1 | High | White |

A system as depicted in TABLE 1 would be sufficient for providing varied illumination for objects having brightly and distinctly colored surfaces. If additional levels of intensity are provided, the range of colors and intensities is expanded. Three levels of individual LED intensities (for example, off, medium, and high) result in 27 ($3^3$) combinations, or an estimated 12 distinct colors and 4 resulting intensities. Four levels of individual LED intensity (off, low, medium, and high) result in 64 combinations, or an estimated 30 distinct colors and more than 6 resulting intensities.

In addition to the intensity variation due to illumination from one or more colors of LEDs, the intensity could be varied independently from the color to achieve low or high intensity for any resulting color of light. This may be useful in a "ring light" configuration (as shown in FIGS. 6A-6C), where it may be necessary to increase the intensity of the LEDs on the outer rings to compensate for the increased spacing between the LEDs (or the decreased lighting density). This could be implemented as a fine adjustment of the intensity to optimize the resulting illumination light.

Figure 8:
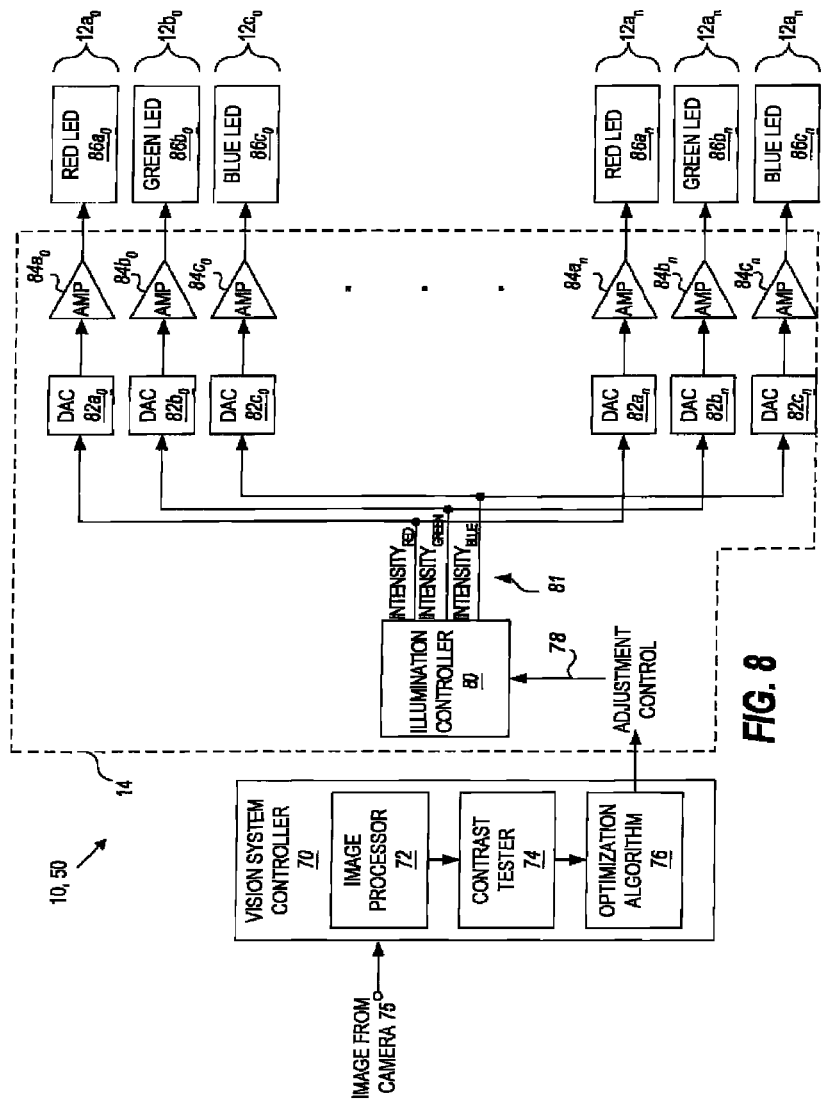
FIG. 8 is a block diagram of a preferred embodiment of an LED circuit board implemented in accordance with the invention.

FIG. 8 is a block diagram of an LED circuit board 10, 50 implemented in accordance with the invention. As illustrated, the LED circuit board 10, 50 comprises a plurality of LED circuits $12a_0$, $12b_0$, $12c_0$, $12a_1$, $12b_1$, $12c_1$, ..., $12a_n$, $12b_n$, $12c_n$, organized into RGB triplets $12_a$-$12_n$. Each LED circuit $12a_0$, $12b_0$, $12c_0$, ..., $12a_n$, $12b_n$, $12c_n$ comprises a digital-to-analog converter $82_{ao}$ ... $82_{an}$, an amplifier $84_{ao}$ ... $84_{an}$, and an LED $86_{ao}$ ... $86_{an}$. Each LED circuit $12_{ao}$, $12_{bo}$, $12_{co}$, ..., $12_{an}$, $12_{bn}$, $12_{cn}$ in each triplet $12_a$-$12_n$ is independently controlled by an illumination controller 80. For each LED color R, B, G, the illumination controller 80 generates a digital code INTENSITY$_{RED}$, INTENSITY$_{GREEN}$, INTENSITY$_{BLUE}$, representing an intensity level for that respective LED color R, B, G. Each red LED circuit $12a_0$, $12a_1$, ..., $12a_n$ receives the digital code INTENSITY$_{RED}$. The LED circuit DAC $82a_0$, ..., $82a_n$ converts it to an analog signal which is amplified by amplifier $84a_0$, ..., $84a_n$ to produce the current flow through the red LED $86a_0$, ..., $86a_n$. The green LED circuits $12b_0$, $12b_1$, ..., $12b_n$ and blue LED circuits $12c_0$, $12c_1$, ..., $12c_n$ are similarly controlled by respective digital codes INTENSITY$_{GREEN}$, INTENSITY$_{BLUE}$.

In the illustrative embodiment, all LED circuits having LEDs of a similar color are each controlled by the same respective intensity signal. Of course, in applications where varying RGB triplet intensity is called for, as for example in the ring pattern, the illumination circuits 80 can generate independent intensity levels for each LED circuits.

Illumination controller 80 is responsive to an adjustment control signal 78 to set the color and intensity of the illumination light. In one embodiment, the adjustment control signal 78 may be set by operator control, via manual adjustment knobs or programming.

Alternatively, the vision system may include an illumination optimization controller 70 (which may be implemented on or remotely from the circuit board itself) which adaptively adjusts the color and intensity of the illumination light based on feedback from the camera 20. In this embodiment, the illumination optimization controller 70 includes an image processor 72, a contrast tester 74, and an optimization algorithm 76. In operation, the illumination optimization controller 70 receives a camera image from the camera 20. The image processor 72 generates pixel data, which is processed by the contrast tester 74 to ascertain the level of contrast detected in the image. The optimization algorithm 76 uses the measurements generated by the contrast tester 74 to generate the adjustment control signal 78.

Figure 9A:
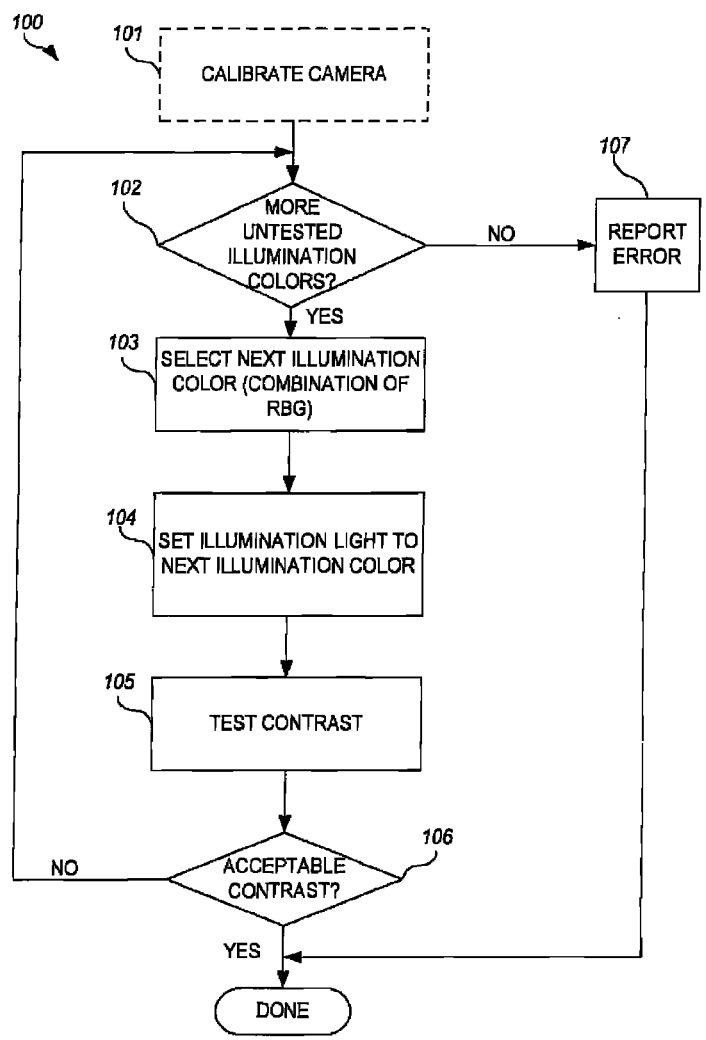
FIG. 9A is an operational flowchart illustrating a first embodiment of an illumination light optimization method in accordance with the invention.

FIG. 9A is flowchart illustrating one embodiment of a method 100 for optimizing the illumination of light. In this embodiment, the camera is calibrated 101 to ensure desired light sensitivity. A first illumination color is selected 102/103. The current in each of the red, green, and blue LEDs is independently adjusted 104 to generate the first illumination color. In the illustrative embodiment, the adjustment control signal 78 instructs the illumination controller 80 to set the red, green, and blue intensity codes to correspond to the first illumination color. Feedback from the camera 20 is used to test 105 the contrast level using illumination light having the first illumination color. If acceptable contrast is achieved, as determined in step 106, the algorithm is complete, and the illumination light is set to the present illumination color. If an acceptable contrast level is not achieved, as determined in step 106, a determination is made 102 as to whether any untested illumination colors remain to be tested. If so, a next illumination color is selected 103, and steps 104-106 are repeated. If no illumination colors yet remain to be tested, an error code 107 is returned to indicate that an illumination color that provides suitable contrast could not be found.

Figure 9B:
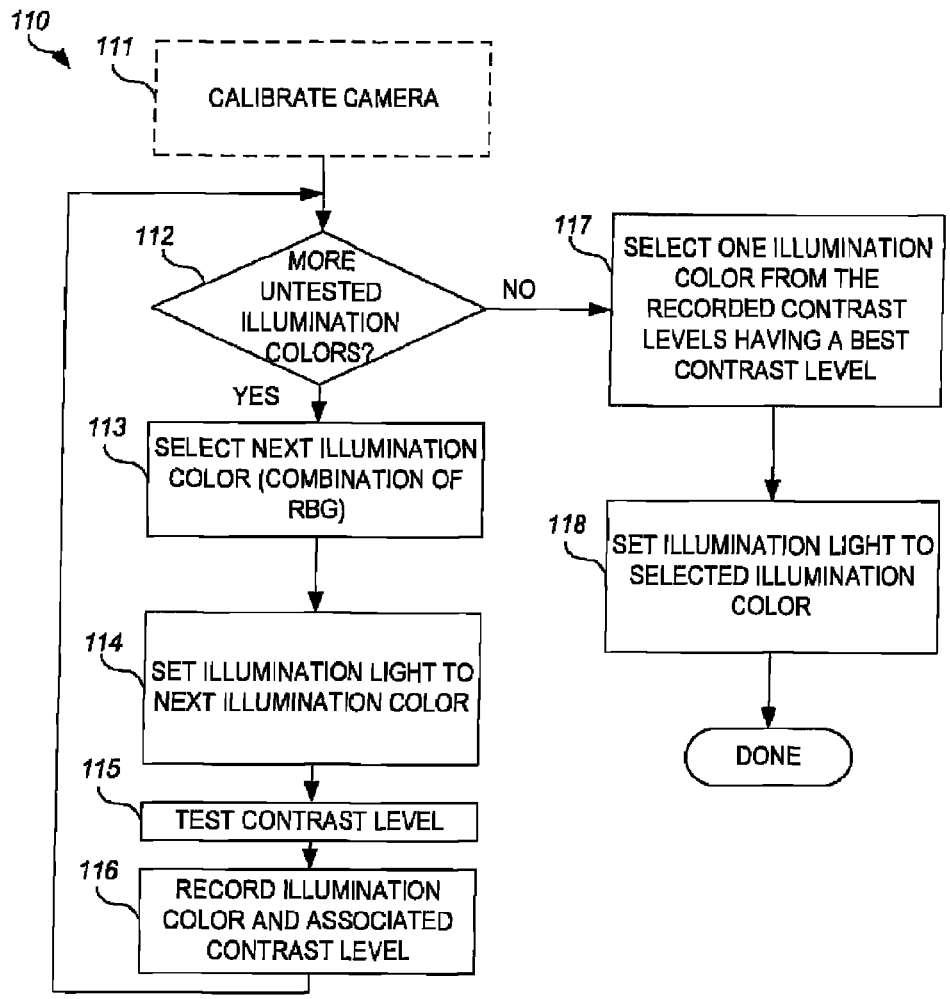
FIG. 9B is an operational flowchart illustrating a second embodiment of an illumination light optimization method in accordance with the invention.

FIG. 9B is a flowchart illustrating a second embodiment of a method 110 for optimizing the contrast and illumination of the LEDs of a vision system. In this embodiment, the camera is again calibrated 111. Then, a first illumination color is selected 112/113. The current in each of the red, green, and blue LEDs is independently adjusted 114 to generate the selected illumination color. Feedback from the camera 20 is used to test 115 the contrast level using illumination light having the selected illumination color. The contrast level associated with the selected illumination color is recorded 116. A determination is then made 112 as to whether any untested illumination colors remain to be tested. If so, steps 113 through 116 are repeated until a determination is made 112 (following each occurrence of step 116) that no untested illumination colors remain to be tested. Once the contrast level has been obtained for all available illumination colors, the contrast levels for each available illumination color are compared to determine a best contrast level from the recorded set of contrast levels. One illumination color associated with the selected best contrast level is selected 117, and the illumination light is set 118 to the selected illumination color.

Figure 9C:
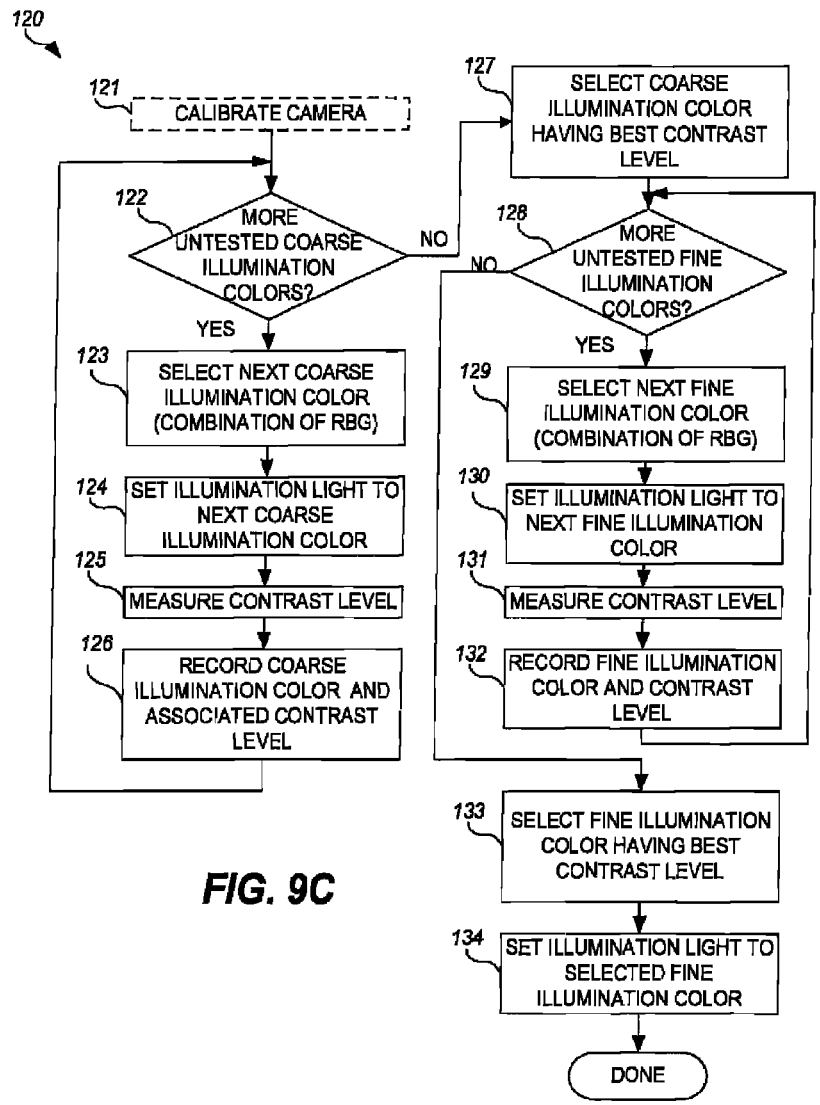
FIG. 9C is an operational flowchart illustrating a first embodiment of a method an illumination light optimization in accordance with the invention.

FIG. 9C is a flowchart illustrating a third embodiment of a method 120 for optimizing the contrast and illumination of the LEDs of a vision system. In this embodiment, the camera is again calibrated 121. Then, a first coarse illumination color is selected 122/123. The current in each of the red, green, and blue LEDs is independently adjusted 124 to generate the selected coarse illumination color. Feedback from the camera 20 is used to measure 125 the contrast level using illumination light having the selected coarse illumination color. The contrast level associated with the selected coarse illumination color is recorded 126. A determination is then made 122 as to whether any untested coarse illumination colors remain to be tested. If so, steps 123 through 126 are repeated until a determination is made 122 (following each occurrence of step 126) that no untested coarse illumination colors remain to be tested. The coarse illumination color having the "best" contrast level from the recorded coarse contrast level measurements is selected 127.

All available illumination colors within the selected coarse illumination color are then evaluated. In particular, a first fine illumination color within the range of the selected coarse illumination color is selected 128/129. The current in each of the red, green, and blue LEDs is independently adjusted 130 to generate the selected fine illumination color. Feedback from the camera 20 is used to measure 131 the contrast level using illumination light having the selected fine illumination color. The contrast level associated with the selected fine illumination color is recorded 132. A determination is then made 122 as to whether any untested coarse illumination colors remain to be tested. If so, steps 128 through 132 are repeated until a determination is made 128 (following each occurrence of step 132) that no untested fine illumination colors remain to be tested. The fine illumination color having the "best" contrast level from the recorded fine contrast level measurements is selected 133, and the illumination light is set 134 to the selected fine illumination color.

As an example, if the equipment examined the contrast level for the primary colors, red, green, and blue, and found the green illumination to give the maximum contrast, all illumination color combinations using green could be tested. This would reduce the number of combinations to a third of the total available combinations, and would correspondingly reduce the illumination light optimization search time to a third of the otherwise total evaluation time. Alternatively, if a smart illumination search was conducted, the number of LED intensity levels could be increased without significantly increasing the overall search time. Four levels of illumination intensity levels correspond to 64 ($4^3$) available colors. A smart search such as that shown in FIG. 9C would reduce the search options to 1+62/3=22 contrast measurements. Using the smart algorithm therefore greatly expands over systems with fewer LED illumination levels that do not use the smart algorithm.

Vision systems acquire images through digital cameras and vision processing hardware and software. An image "capture" may be defined as the acquisition of pixel data for an entire set of pixels which make up a single image. A conservative estimate for a current image capture rate (i.e., the number of images that can be captured in a given period of time) is 20 to 30 images per second. Contrast optimization is a direct addition to the process time of the processing equipment. Depending on the ratio of the contrast optimization time to the overall product processing time, it may be desirable to allow the contrast optimization to occur in series with the part processing—that is, optimize the contrast for each part once the part is in position for processing—or it may be desirable to perform the contrast optimization in parallel with the part processing stage—that is, locate the vision system stage upstream from the part processing stage such that the illumination light is pre-optimized by the time the part reaches the part processing stage.

In addition, the use of the contrast optimization on equipment will depend on the value of the part and the variability of its appearance. Less expensive parts or parts with low visual variability may need less frequent contrast optimization, or none at all. More expensive parts with lots of variation in appearance may need each part to undergo automated contrast optimization. The frequency of use of contrast optimization will likely therefore be based on manufacturing cost, efficiency, throughput, and scrap costs.

Figure 10A:
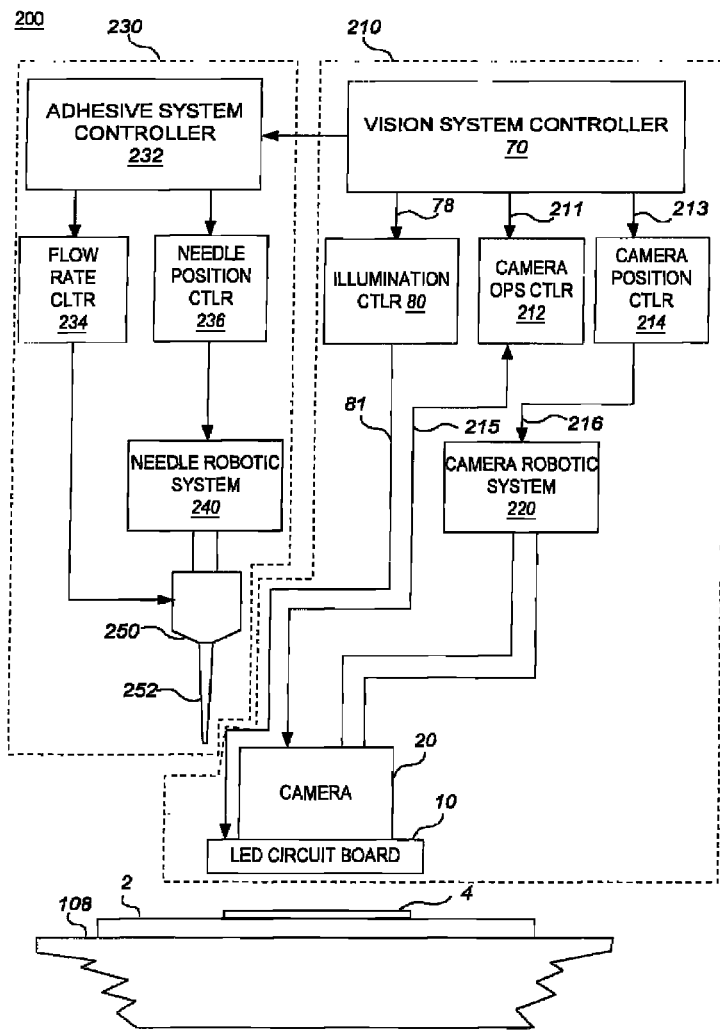
FIG. 10A is a block diagram of an automated adhesive dispensing system which employs a vision system of the invention that is inspecting a silicon die.
Figure 10B:
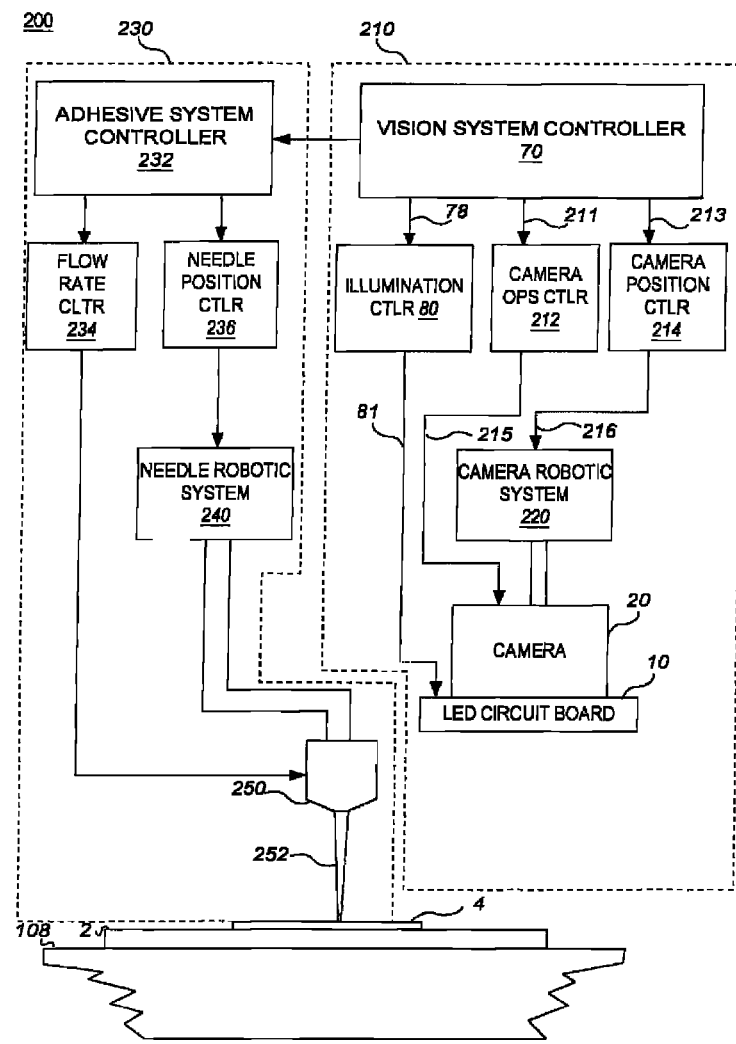
FIG. 10B is a block diagram of the automated adhesive dispensing system of FIG. 10A illustrating the application of adhesive to the silicon die.

FIGS. 10A and 10b illustrate an example of an automated adhesive dispensing system 200 which employs a vision system 210 implemented in accordance with the invention for use as an automated optical inspection device. The automated adhesive dispensing system 200 is configured with a plate 2 on which a silicon die 4 is positioned for processing.

The vision system 210 includes a camera 20 and LED circuit board 10 as described previously and as shown in FIG. 6A-6C or 7, and FIG. 8. The vision system 210 is also provided with a vision system controller 70 and illumination controller 80, whose purpose and operation are described previously and shown in FIG. 8. In addition, the vision system 210 is provided with a camera operations controller 212 which generates camera operations control signals 215 through which camera operations such as camera settings and image capture are controlled, a camera position controller 214 which generates robotic system control signals 216 through which the physical position of the camera 20 with respect to the part 4 being processed is controlled, and a camera robotics system 220 which comprises the mechanical and electronic components for physically positioning the camera 20.

The automated adhesive dispensing system 200 also includes an adhesive application system 230, which comprises an adhesive system controller 232, an adhesive flow rate controller 234, a needle position controller 236, and a robotic system 240 which includes the mechanical and electronic elements necessary for positioning a needle 252 and its adhesive dispensing unit 250 into various positions. The adhesive dispensing unit 250 holds adhesive 254 and dispenses it through the tip of the needle 252. The adhesive application controller 232 controls the positioning of the needle and dispensing of adhesive by issuing commands to the adhesive flow rate controller 234 and dispensing position controller 236, which respectively generate control signals to control the adhesive dispensing unit 250 and robotic system 240.

In operation, the vision system 210 positions the camera 20 such that the camera lens (not visible in this view) views the part 4, as illustrated in FIG. 10A. In this regard, the vision system controller 70 generates positioning commands 211 instructing the camera position controller 214 to position the camera 20 over the part 4. The camera position controller 214 then generates robotic control signals 216 instructing the robotic system 220 to move the camera 20 into the desired position.

Once in position, the vision system controller 70 optimizes the illumination light as discussed above in conjunction with FIGS. 8, 9A and 9B. The LED circuits on the LED circuit board 10 are responsive to the digital codes $INTENSITY_{RED}$, $INTENSITY_{GREEN}$, $INTENSITY_{BLUE}$ generated by the illumination controller 80 (see FIG. 8) to produce the desired illumination light.

The vision system controller 70 generates camera operations commands 211 to instruct the camera operations controller 212 to generate the appropriate camera operations control signals 215, such as setting camera parameters, triggering an image capture, etc., to operate the camera as desired.

During part processing, the vision system controller 70 issues camera positioning commands 211 to the camera positioning controller 214 in order to move the camera to various positions as necessary to the particular application, and issues camera operations commands 212 to the camera controller 212 in order to operate the camera 20 for collecting and processing image information necessary to locate and/or identify desired features of the part 4 being processed. In the illustrative embodiment, adhesive is applied to predetermined locations on the surface of the die 4; accordingly, these predetermined locations must be identified prior to application of the adhesive. One method of ascertaining the predetermined positions of the die 4 is to locate and identify the edges of the die 4 and calculating the predetermined locations based on the locations of the edges. Edges may be found by placing the die 4 against a dark background such as dark grey or black and illuminating the surface of the die 4 using light of a different but non-complementary color of the die surface. The edges may then be found by comparing the contrast level of adjacent pixels. Continuous sets of pixels having high contrast to adjacent pixels indicates edges of the die or features on the die.

FIG. 10B is a block diagram of the automated adhesive dispensing system 200 illustrating the adhesive application system 230 dispensing adhesive 254 onto the silicon die 4. As illustrated, during application of the adhesive 254 to the surface of the die 4, the camera 20 is positioned away from the part 4, allowing the needle 252 to be positioned, under the control of the positioning controller 236, over the predetermined adhesive dispensing locations on the part. Adhesive 254 is then dispensed through the tip of the needle 252 under the control of the flow rate controller 234.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method for automatically adapting illumination light in a vision system to a color of a part feature against a part feature background of a part being viewed by said vision system, comprising:

selecting an untested available illumination color;

setting said illumination light in said vision system to said selected illumination color;

measuring a contrast level between said part feature and said part feature background;

recording said measured contrast level;

determining whether any untested available illumination colors remain;

repeating said selecting step through said determining step if any untested available illumination colors remain;

selecting from said recorded measured contrast levels at least one illumination color that meets acceptable contrast criteria; and setting said illumination light in said vision system to said selected illumination color that meets acceptable contrast criteria.

2. A method in accordance with claim 1, wherein said step of selecting from said recorded measured contrast levels comprises:

selecting an illumination color having a highest contrast level from among said recorded contrast level measurements.

3. A non-transitory computer readable storage medium tangibly embodying program instructions for automatically adapting illumination light in a vision system to a color of a part feature against a part feature background of a part being viewed by said vision system, comprising the steps of:
- selecting an untested available illumination color;
- setting said illumination light in said vision system to said selected illumination color;
- measuring a contrast level between said part feature and said part feature background;
- recording said measured contrast level; determining whether any untested available illumination colors remain;
- repeating said selecting step through said determining step if any untested available illumination colors remain;
- selecting from said recorded measured contrast levels at least one illumination color that meets acceptable contrast criteria; and
- setting said illumination light in said vision system to said selected illumination color that meets acceptable contrast criteria.

4. A non-transitory computer readable storage medium in accordance with claim 3, further comprising the steps of: selecting an illumination color having a highest contrast level from among said recorded contrast level measurements.

5. A method for automatically adapting illumination light in a vision system to a color of a part feature against a part feature background of a part being viewed by said vision system, comprising:
- selecting an untested available coarse illumination color;
- setting said illumination light in said vision system to said selected coarse illumination color;
- measuring a contrast level between said part feature and said part feature background;
- determining whether any untested available coarse illumination colors remain;
- repeating said step of selecting an untested available coarse illumination color through said step of determining whether any untested available coarse illumination colors remain if any untested available coarse illumination colors remain;
- selecting one of said coarse illumination colors that meets acceptable contrast criteria based on said measured coarse contrast levels; and
- selecting an untested available fine illumination color within a range of said selected coarse illumination color;
- setting said illumination light in said vision system to said selected fine illumination color;
- measuring a contrast level between said part feature and said part feature background;
- determining whether any untested available fine illumination colors within said range of said selected coarse illumination color remain;
- repeating said step of selecting an untested available fine illumination color through said step of determining whether any untested available fine illumination colors within said range of said selected coarse illumination color remain if any untested available fine illumination colors remain;
- selecting an acceptable contrast level that meets acceptable contrast criteria from said measured fine contrast levels; and
- setting said illumination light to said fine illumination color corresponding to said acceptable contrast level.

6. A non-transitory computer readable storage medium tangibly embodying program instructions for automatically adapting illumination light in a vision system to a color of a part feature against a part feature background of a part being viewed by said vision system, comprising the steps of:
- selecting an untested available coarse illumination color;
- setting said illumination light in said vision system to said selected coarse illumination color;
- measuring a contrast level between said part feature and said part feature background;
- determining whether any untested available coarse illumination colors remain; repeating said step of selecting an untested available coarse illumination color through said step of determining whether any untested available coarse illumination colors remain if any untested available coarse illumination colors remain;
- selecting one of said coarse illumination colors that meets acceptable contrast criteria based on said measured coarse contrast levels; and
- selecting an untested available fine illumination color within a range of said selected coarse illumination color;
- setting said illumination light in said vision system to said selected fine illumination color;
- measuring a contrast level between said part feature and said part feature background;
- determining whether any untested available fine illumination colors within said range of said selected coarse illumination color remain;
- repeating said step of selecting an untested available fine illumination color through said step of determining whether any untested available fine illumination colors within said range of said selected coarse illumination color remain if any untested available fine illumination colors remain;
- selecting an acceptable contrast level that meets acceptable contrast criteria from said measured fine contrast levels; and
- setting said illumination light to said fine illumination color corresponding to said acceptable contrast level.

* * * * *